April 25, 1961

G. BERGSON 2,981,278

VAPORIZING VALVE

Filed May 2, 1958

INVENTOR.
Gustav Bergson
BY
Eugene M. Whitacre
ATTORNEY.

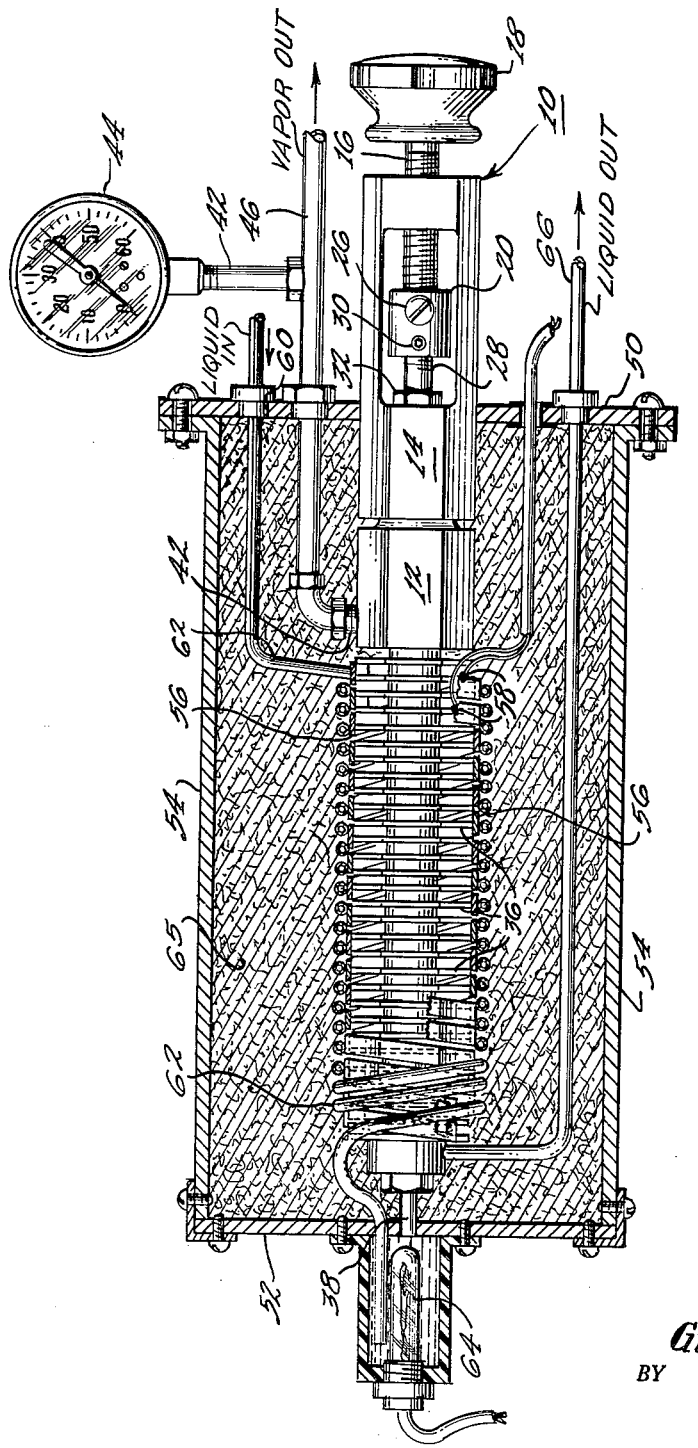

United States Patent Office 2,981,278
Patented Apr. 25, 1961

2,981,278
VAPORIZING VALVE
Gustav Bergson, Jenkintown, Pa.
(York Road and Sunset Lane, Hatboro, Pa.)
Filed May 2, 1958, Ser. No. 732,583
5 Claims. (Cl. 137—340)

This invention relates to mechanical valves, and more paritcularly relates to vaporizing valves for providing controllable expansion of gases from a vaporizable liquid.

Many industrial operations involve the use of liquids, the composition of which must be carefully controlled. For example, it may be desirable to maintain one of the components of a liquid used in an industrial process within prescribed limits. To illustrate, in refrigeration systems it is necessary to reduce the water content of the refrigerant below a prescribed minimum to prevent freezing of the water and the consequent restriction of the flow of refrigerant.

To determine whether the composition of the liquid being used conforms to the prescribed standards, a portion of the liquid from the liquid flow stream of a given system may be vaporized and tested to determine the content thereof. In a continuous industrial process, it is desirable to provide apparatus wherein a substantially continuous indication of the condition of the liquid flow stream may be obtained.

One system for continuously providing a vaporized sample of a liquid, includes a vaporization valve in accordance with the invention. The valve is associated with the liquid in the flow stream which is maintained under temperature and pressure conditions such that portions of the liquid at the orifice of the valve will vaporize into the lower pressure of the valve. In order to accurately maintain the desired pressure differential and provide accurate control over the volume expansion of the vapor, it is desirable that the valve be precisely capable of controlling the orifice dimension. Since the process of evaporation requires heat, the valve will tend to cool, and therefore steps must be taken to prevent condensation of the vaporization products on the internal walls of the valve. Furthermore, the valve must be designed to be incorporated in the main liquid flow stream in a manner that liquid actually moving in the main flow stream passes close to the valve orifice to prevent undesirable lag between the indication of, and the instantaneous characteristics of the liquid in the main stream.

It is a primary object of this invention to provide an improved vaporizing valve.

A further object of this invention is to provide an improved vaporizing valve which is adapted to be associated with a liquid flow stream in a manner that liquid actually moving in the flow stream passes close to the valve orifice to prevent a substantial lag between the compositional characteristics of gas vaporized into the valve, and that of the liquid actually flowing in the stream.

Another object of this invention is to provide an improved vaporizing valve which provides minimum lag between the liquid vaporized into the valve, and the liquid actually flowing in the stream past the valve orifice, and wherein condensation of the vapor in the valve is minimized or prevented entirely.

Still another object of this invention is to provide an improved vaporizing valve of precision construction which may be accurately controlled to provide a desired volume expansion of a vapor which corresponds, with minimum lag, to a liquid flowing in a process stream with which the valve is associated.

The vaporizing valve of the invention comprises an elongated body portion having a tapered bore. An elongated valve seating member having a complementary taper is adapted to be positioned in the bore. A suitable handwheel and stem mechanism may be provided to control the position of the valve seating member in the bore and thereby the dimension of the orifice opening. To prevent condensation of the vapor expanded into the valve, suitable heat transfer means, such as heat conductive fins, are in intimate contact with the elongated body portion. The heat transfer means supplies the necessary heat for the vaporization process without substantial cooling of the valve surfaces, and since the valve is maintained at substantially constant temperature, substantially none of the vapor condenses. The inlet orifice of the valve is adapted to be in, or adjacent the liquid stream of the system in which the vaporizing valve is used. Even a small amount of dead liquid (not in the moving stream) between the valve orifice and the moving liquid stream causes a serious lag between the liquid being vaporized and that actually in the flow stream. This will be understood when it is realized that only 3 cc. of water may be converted to about 4000 cc. of gas at atmospheric pressure.

The novel features that are considered to be characteristic of this invention are set forth with particularity in the appended claims. The invention itself, however, both as to its organization and method of operation, as well as additional objects and advantages thereof will best be understood from the following description when read in connection with the accompanying drawings, in which:

Figure 3 is cut away view of an apparatus for adapting the vaporizing valve of the invention for use with liquids which vaporize at higher temperatures.

Figure 2:
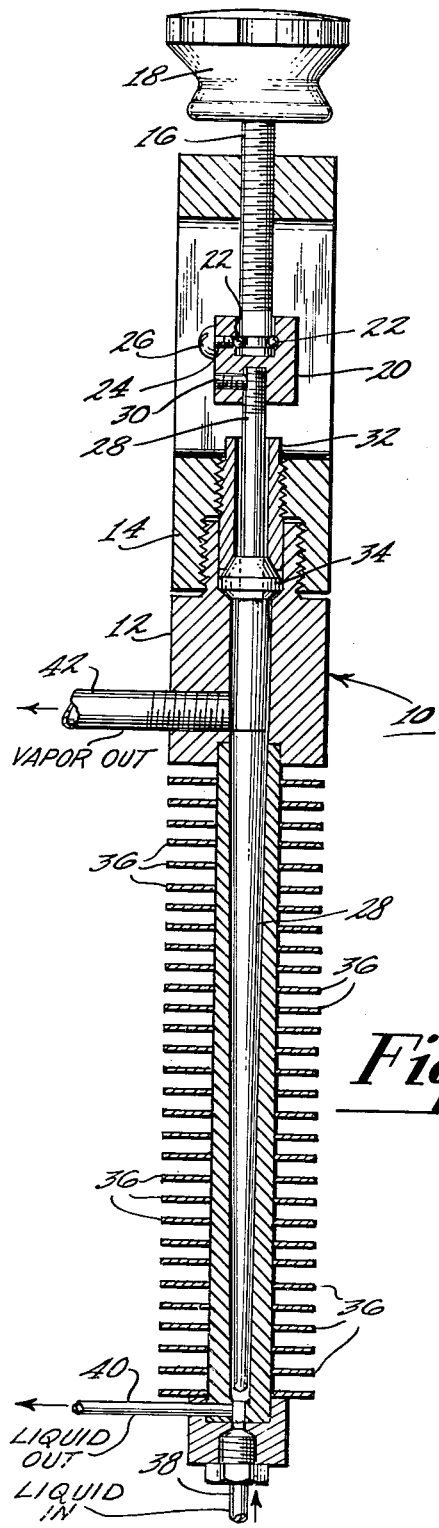
Figure 2 is a sectional view taken on the section lines 2—2 of the vaporizing valve of Figure 1.
Figure 1:
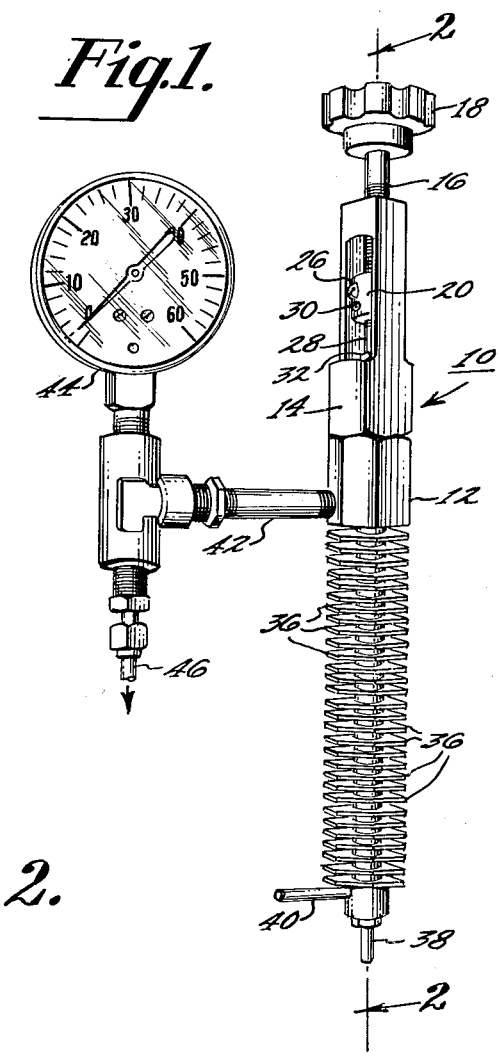
Figure 1 is a front elevational view of a vaporizing valve in accordance with the invention.

Referring now to the drawings wherein like reference numerals will be used to designate similar components throughout, and particularly to Figures 1 and 2, the valve 10 includes a main body portion 12 and a bonnet 14. The upper end of the bonnet 14 is tapped to receive a threaded stem 16. A knob or handwheel 18 is affixed to one end of the stem 16, and the opposite end of the stem 16 is journaled for rotation in a collar 20. To this end the surfaces of the stem 16 and collar 20 which are in juxtaposition are provided with corresponding annular grooves for receiving ball bearings 22. The ball bearings are fed into the race provided by these grooves through an aperture 24 in the collar 20, which aperture is sealed by the screw 26. In this manner, the stem 16 may rotate independently of the collar 20, yet these elements are coupled for axial movement.

The opposite end of the collar 20 is tapped to receive a threaded end of an elongated tapered valve seating member 28 which extends downwardly along the axis of the bonnet 14 into the main body portion 12 of the valve. A set screw 30 extending through one side of the collar 20 bears against a flattened portion on the threaded end of the valve seating member 28 to maintain the valve seating member against rotation.

A sealing screw 32 which has a central aperture for receiving the valve seating member 28 is received in a tapped opening in the lower portion of the bonnet 14. The sealing screw 32 has a conically shaped recess for receiving an annular washer 34 which is snugly fitted over the valve seating member 28.

The bottom end of the bonnet 14 is tapped to receive a threaded end of the main body portion 12 of the valve 10. The main body portion 12 has a tapered bore for receiving the valve seating member 28. It will be noted from the foregoing that the valve seating member 28 does not rotate in the bore of the main body portion 12, as it is moved axially by rotation of the handwheel 18. This is of advantage in that the seating member 28 may be fitted for a maintainable optimum seating position in the bore. The materials of which the body portion 12 are constructed provide good heat conductivity, and a series of fins 36 are provided on the body portion 12 to enhance the heat transfer characteristics between the valve and its surrounding environment.

The lower end of the body portion 12 includes an axially extending aperture adapted to receive a fitting or a pipe 38 and a radially extending aperture adapted to receive a pipe 40 which may be brazed or otherwise affixed to the body portion 12. Suitable connections may be made to the pipes 38 and 40 so that a liquid for an industrial process or operation flows into one of the fittings and out of the other. It will be noted that the liquid stream flows substantially in the vicinity of the valve orifice formed by the tapered bore and the valve seating member 28, so that liquid vaporized into the valve is substantially that from the liquid actually moving in the flow stream.

An aperture extending radially through the upper end wall of the body portion 12 provides an outlet port for gas vaporized into the valve 10. Gases escaping from this outlet port pass through the pipe 42, and may be fed to a pressure gauge 44 and through the pipe 46 to utilization means, such as suitable testing apparatus.

A liquid stream at a temperature such that its vapor pressure would be above atmospheric remains in the liquid state in the closed flow system including the pipes 38 and 40. If the valve 10 is opened, by rotation of the handwheel 18 and consequent withdrawal of the valve seating member 28, the liquid at the valve orifice is exposed to a lower pressure, and hence vaporizes. In vaporizing, the vapor absorbs heat thereby cooling the surfaces of the valve. By virtue of the excellent heat transfer characteristics provided along the length of the valve by the fins 36, the valve does not cool appreciably, thereby minimizing or preventing subsequent condensation of the vapors in the valve. In this manner all of the components of the vaporized gas are fed to the utilization means such as the test apparatus to provide a true indication of characteristics of the liquid in the stream. For example, in the refrigeration system mentioned above, the vaporizing valve is used in a system to measure the water content of the refrigerant. It is therefore desirable that the water vapor of the vaporized gas should not condense in the valve if an accurate indication of the water content is to be had. The pressure of the vapor escaping from the valve as indicated by the pressure gauge 44 is adjusted by rotation of the handwheel 18.

Since the liquid vaporized is taken substantially directly from the liquid flow stream, very little lag can exist between the compositional characteristics of the vapor in the valve, and that of the liquid in the main stream.

Figure 3 shows the vaporizing valve of the invention with adjuncts adapted to permit its operation with liquids which vaporize at higher temperatures than room temperature. The main body portion 12 of the valve 10 is enclosed in a chamber defined by the front and rear walls 50 and 52 and the side walls 54. The heat transfer fins 36, which may be removed in this embodiment of the invention if desired, are covered by a strip heater 56, which comprises an electrically heated element having a pair of connection terminals 58 extending from the front wall 50. Liquid for a process or operation, a portion of which is to be vaporized in the valve 10, is admitted through an inlet port 60, and is passed through a pipe 62 wound around the strip heater 56. The liquid is then passed through a channel and into a housing containing a temperature bulb 64 which provides a voltage representative of the liquid temperature. The liquid then flows past the valve orifice as described in connection with Figures 1 and 2, and out through an outlet port 66. Suitable insulation material 65 may be provided within the chamber to minimize heat loss.

Liquid entering from the inlet port 60 is heated in the pipe 62 by the strip heater 56 to a temperature at which the liquid will readily vaporize save for the pressure under which the liquid is held in the pipe 62. The heated liquid then flows around the temperature bulb 64 to which is connected with apparatus for indicating the liquid temperature. If the temperature is too low, additional heating current may be provided through the connection terminals 58, and for too high a temperature, the heating current may be reduced. The liquid is then passed to the vaporizing valve orifice as described in connection with Figures 1 and 2. The heat of vaporization required by the vaporizing liquid is readily supplied by the strip heater 56 to prevent condensation of the vapors in the valve 10. It should be understood that the valve 10 may also be used for expanding gases under high pressure to lower pressure without departing from the scope of the invention.

Having described the invention what is claimed is:

1. A vaporizing valve for permitting controlled expansion of condensible vapors of a vaporizable liquid from a liquid flow stream and adapted to provide minimum lag between the liquid vaporized into the valve and that flowing in the liquid flow stream past the valve comprising a bonnet having a stem threadedly received therein and extending along the axis of said bonnet, a handwheel secured to one end of said stem and an elongated tapered valve seating member extending axially out of said bonnet secured to the other end of said stem, a main valve body portion affixed to said bonnet and having a tapered bore for receiving said valve seating member, said valve seating member and said bore providing an adjustable orifice near an end of said main valve body portion remote from said bonnet, the adjustment of said orifice being effected by rotation of said handwheel to move said stem and said seating member axially with respect to said bonnet and said main valve body portion, means providing liquid inlet and outlet ports near said one end of said main valve body portion, said liquid inlet and outlet ports positioned to direct liquids in said stream from the inlet port to the outlet port substantially past said orifice provided by said valve seating member and said bore, means providing intimate thermal contact between said main valve body portion and the environmental surroundings of said main valve body portion so that vapors expanded into the bore of said main valve body portion are maintained at a temperature to minimize condensation thereof in the bore of said main valve body portion, and a vapor outlet port communicating with said bore extending radially through one side of said main body portion near the end thereof adjacent said bonnet, said vapor outlet port adapted to be maintained at a pressure which is lower than the pressure at said orifice.

2. A vaporizing valve for permitting controlled expansion of condensible vapors of a vaporizable liquid from a liquid flow stream and adapted to provide minimum lag between the liquid flow stream past the valve comprising a bonnet having a stem threadedly received therein and extending along the axis of said bonnet, a handwheel secured to one end of said stem and an elongated tapered valve seating member extending axially out of said bonnet secured to the other end of said stem, a sealing screw having a central opening for receiving said valve seating member supported in said bonnet, said sealing screw having a recess in the lower end thereof, a washer snugly positioned on said valve seating member and adapted to snugly engage the recess in the lower end of said sealing screw, a main valve body portion affixed to said bonnet and having a tapered bore for receiving said valve seating member, said valve seating member and said bore providing an adjustable orifice near an end of said main valve body portion remote from said bonnet, the adjustment of said orifice being effected by rotation of said handwheel to move said stem and said seating member axially with respect to said bonnet and said main valve body portion, means providing liquid inlet and outlet ports in said main valve body portion near said end thereof, said liquid inlet and outlet ports positioned to direct liquids in said stream from the inlet port to the outlet port substantially past said orifice provided by said valve seating member and said bore, means providing intimate thermal contact between said main valve body portion and the environmental surroundings of said main valve body portion so that vapors expanded into said bore are maintained at a temperature to minimize condensation thereof in said bore, and a vapor outlet port communicating with said bore extending radially through one side of said main body portion near the end adjacent said bonnet.

3. A vaporizing valve for permitting controlled expansion of condensible vapors of a vaporizable liquid from a liquid flow stream and adapted to provide minimum lag between the liquid vaporized into the valve and that flowing in the liquid flow stream past the valve comprising a bonnet having a stem threadedly received therein and extending along the axis of said bonnet, a handwheel secured to one end of said stem, elongated tapered valve seating member extending axially out of said bonnet, coupling means rotatably secured to the other end of said stem and rigidly secured to said seating member to provide axial movement of said seating member without rotation thereof, a main valve body portion affixed to said bonnet and having a bore with a taper complementary to that of said seating member for receiving said valve seating member, said valve seating member and said bore providing an adjustable orifice near an end of said main valve body portion remote from said bonnet, the adjustment of said orifice being effected by rotation of said handwheel to move said stem and said seating member axially with respect to said bonnet and said main valve body portion, means providing liquid inlet and outlet ports in said main valve body portion near said end thereof, said liquid inlet and outlet ports positioned to direct liquids in said stream from the inlet port to the outlet port substantially past said orifice provided by said valve seating member and said bore, means providing intimate thermal contact between said main valve body portion and the environmental surroundings of said main valve body portion so that vapors expanded into said bore are maintained at a temperature to minimize condensation thereof in said bore, and a vapor outlet port communicating with said bore extending radially through one side of said main body portion near the end adjacent said bonnet.

4. A vaporizing valve for permitting controlled expansion of condensible vapors of a vaporizable liquid from a liquid flow stream and adapted to provide minimum lag between the liquid flow stream past the valve comprising a bonnet having a stem threadedly received therein and extending along the axis of said bonnet, a handwheel secured to one end of said stem, an elongated tapered valve seating member extending axially out of said bonnet, coupling means rotatably secured to the other end of said stem and rigidly secured to said valve seating member to provide axial movement of said seating member without rotation thereof, a sealing screw having a central opening for receiving said valve seating member supported in said bonnet, said sealing screw having a recess in the lower end thereof, a washer snugly positioned on said valve seating member and adapted to snugly engage the recess in the lower end of said sealing screw, a main valve body portion affixed to said bonnet and having a bore with a taper complementary to that of said valve seating member for receiving said valve seating member, said valve seating member and said bore providing an adjustable orifice near an end of said main valve body portion remote from said bonnet, the adjustment of said orifice being effected by rotation of said handwheel to rotate said stem and thereby move said seating member axially without rotation with respect to said bonnet and said main valve body portion, means providing liquid inlet and outlet ports in said main valve body portion near said end thereof, said liquid inlet and outlet ports positioned to direct liquids in said stream from the inlet port to the outlet port substantially past said orifice provided by said valve seating member and said bore, means providing intimate thermal contact between said main valve body portion and the environmental surroundings of said main valve body portion so that vapors expanded into said bore are maintained at a temperature to minimize condensation thereof in said bore, a vapor outlet port communicating with said bore extending radially through one side of said main body portion near the end adjacent said bonnet and means providing a pressure at said vapor outlet which is lower than the pressure at said orifice.

5. A vaporizing valve system adapted to vaporize liquids which vaporize at temperatures higher than room temperature comprising a vaporizing valve including a bonnet having a stem threadedly received therein and extending along the axis of said bonnet, a handwheel secured to one end of said stem and an elongated tapered valve seating member extending axially out of said bonnet secured to the other end of said stem, a main valve body portion affixed to said bonnet and having a tapered bore for receiving said valve seating member, said valve seating member and said bore providing an adjustable orifice near an end of said main valve body portion remote from said bonnet, the adjustment of said orifice being effected by rotation of said handwheel to move said stem and seating member axially with respect to said bonnet and said main valve body portion, means providing liquid inlet and outlet ports in said main valve body portion near said end thereof, a vapor outlet port communicating with said bore through one side of said main body portion near the end thereof affixed to said bonnet, heating means associated with said main body portion, and an inlet conduit for liquids to be vaporized connected with said inlet port and in intimate thermal contact with said heating means.

References Cited in the file of this patent
UNITED STATES PATENTS

| | | |
|---|---|---|
| 1,801,959 | Hopkins | Apr. 21, 1931 |
| 1,988,289 | Whitteman | Jan. 15, 1935 |
| 2,580,649 | Bludeau | Jan. 1, 1952 |
| 2,844,964 | Guibert | July 29, 1958 |